US010071851B2

(12) United States Patent
Vu

(10) Patent No.: US 10,071,851 B2
(45) Date of Patent: Sep. 11, 2018

(54) APPARATUS AND PRODUCTS FOR PRODUCING BEVERAGES, AND METHODS FOR MAKING AND USING SAME

(76) Inventor: Robert Bao Vu, Houston, TX (US)

( * ) Notice: Subject to any disclaimer, the term of this patent is extended or adjusted under 35 U.S.C. 154(b) by 1519 days.

(21) Appl. No.: 13/181,478

(22) Filed: Jul. 12, 2011

(65) Prior Publication Data

US 2013/0017303 A1   Jan. 17, 2013

Related U.S. Application Data

(60) Provisional application No. 61/399,382, filed on Jul. 12, 2010.

(51) Int. Cl.
| | | |
|---|---|---|
| A47J 31/06 | (2006.01) | |
| A23F 5/26 | (2006.01) | |
| A47J 31/00 | (2006.01) | |
| B65D 85/804 | (2006.01) | |

(52) U.S. Cl.
CPC ...... B65D 85/8043 (2013.01); A47J 31/0689 (2013.01)

(58) Field of Classification Search
CPC ............... A47J 31/0668; A47J 31/0689; A47J 31/3676; A47J 31/369; A47J 31/407; B65D 85/8043
USPC ............... 99/295, 323; 426/77–79, 115, 433; D7/399–401
See application file for complete search history.

(56) References Cited

U.S. PATENT DOCUMENTS

| | | | |
|---|---|---|---|
| 2,778,739 A | 1/1957 | Rodth | |
| 3,166,003 A * | 1/1965 | Merson | A47J 31/02 210/474 |
| 3,490,356 A * | 1/1970 | Peterson | A47J 31/4478 239/498 |
| 3,952,642 A * | 4/1976 | Vitous | A47J 31/057 99/300 |
| 5,325,765 A | 7/1994 | Sylvan et al. | |
| 5,398,595 A | 3/1995 | Fond et al. | |
| 5,840,189 A * | 11/1998 | Sylvan | B65D 85/8043 210/233 |
| D408,679 S | 4/1999 | Potts et al. | |
| 6,079,315 A | 6/2000 | Beaulieu et al. | |
| 6,082,247 A | 7/2000 | Beaulieu et al. | |
| 6,142,063 A | 11/2000 | Beaulieu | |
| 6,182,554 B1 | 2/2001 | Beaulieu et al. | |
| 6,260,476 B1 * | 7/2001 | Pope | A47J 31/446 210/474 |
| D452,433 S | 12/2001 | Lazaris | |
| D452,434 S | 12/2001 | Sweeney | |
| 6,440,256 B1 | 8/2002 | Gordon et al. | |
| D462,865 S | 9/2002 | Honan et al. | |
| D474,110 S | 5/2003 | Sweeney | |
| D474,111 S | 5/2003 | Lazaris | |
| 6,589,577 B2 | 7/2003 | Lazaris et al. | |
| 6,607,762 B2 | 7/2003 | Lazaris et al. | |
| 6,606,938 B2 | 8/2003 | Taylor | |

(Continued)

OTHER PUBLICATIONS

Cuisinart Instruction Booklet, copyright 2010.

*Primary Examiner* — Dana Ross
*Assistant Examiner* — Kuangyue Chen
(74) *Attorney, Agent, or Firm* — Gilbreth & Associates, PC; J. M. (Mark) Gilbreth

(57) ABSTRACT

A brewing container for use with brewing machines, the container including a distribution outlet for dispersing the injected water in at least 3 directions away from vertical within the cartridge.

2 Claims, 5 Drawing Sheets

(56) References Cited

U.S. PATENT DOCUMENTS

| | | | |
|---|---|---|---|
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,666,130 B2 | 12/2003 | Taylor et al. | |
| 6,672,200 B2 | 1/2004 | Duffy et al. | |
| 6,708,600 B2 | 3/2004 | Winkler et al. | |
| D489,215 S | 5/2004 | Honan et al. | |
| D502,362 S | 3/2005 | Lazaris et al. | |
| D513,572 S | 1/2006 | Schaffeld et al. | |
| 7,165,488 B2 * | 1/2007 | Bragg | A47J 31/0673 426/433 |
| D544,299 S | 6/2007 | Schaffeld | |
| 7,231,870 B2 * | 6/2007 | Lowe | A47J 31/0605 99/299 |
| D563,161 S * | 3/2008 | Bodum | D7/399 |
| 7,347,138 B2 | 3/2008 | Bragg et al. | |
| 7,360,418 B2 | 4/2008 | Pelovitz | |
| 7,377,162 B2 | 5/2008 | Lazaris | |
| 7,398,726 B2 | 7/2008 | Streeter et al. | |
| 7,513,192 B2 | 4/2009 | Sullivan et al. | |
| 7,523,695 B2 | 4/2009 | Streeter et al. | |
| 7,543,527 B2 | 6/2009 | Schmed | |
| 7,640,845 B2 | 1/2010 | Woodnorth et al. | |
| 7,677,158 B2 | 3/2010 | McDuffie et al. | |
| D637,484 S | 5/2011 | Winkler | |
| 8,291,812 B2 | 10/2012 | Rivera | |
| 8,621,981 B2 | 1/2014 | Rivera | |
| 8,720,320 B1 | 5/2014 | Rivera | |
| 8,794,125 B1 | 8/2014 | Rivera | |
| 8,813,633 B2 | 8/2014 | Ricotti | |
| 9,232,871 B2 | 1/2016 | Rivera | |
| 9,232,872 B2 | 1/2016 | Rivera | |
| 2006/0236871 A1 * | 10/2006 | Ternite | B65D 85/8043 99/295 |
| 2007/0157821 A1 | 7/2007 | Panesar et al. | |
| 2007/0259074 A1 * | 11/2007 | Searchilli | B65D 85/8043 426/78 |

* cited by examiner

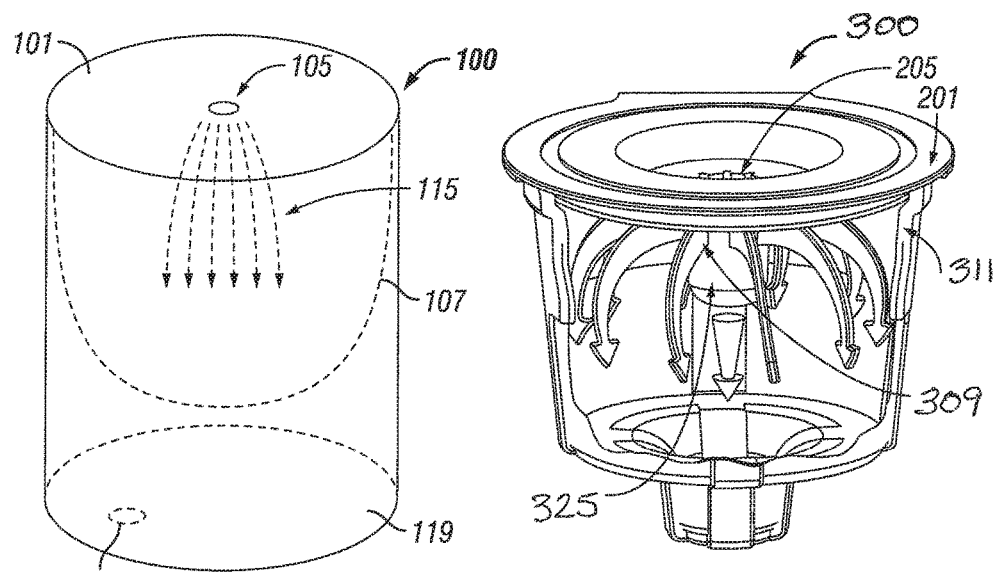
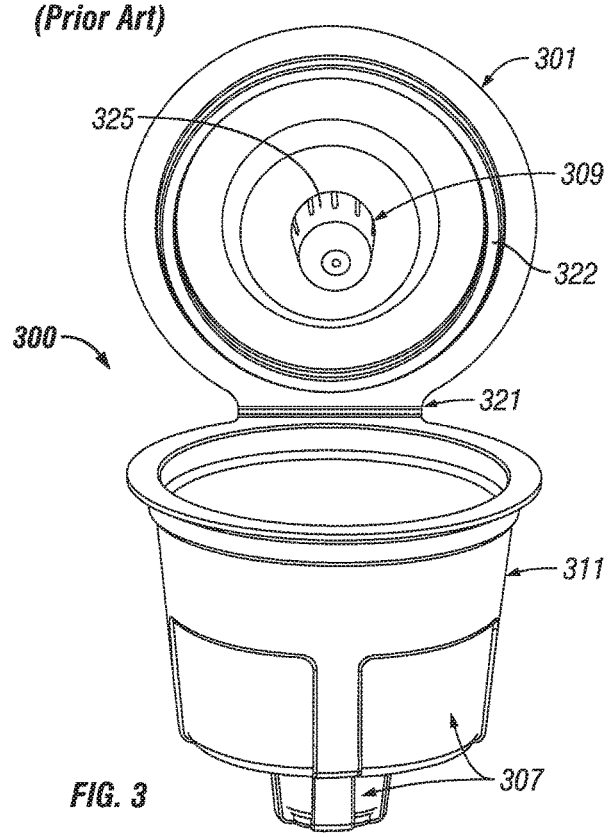

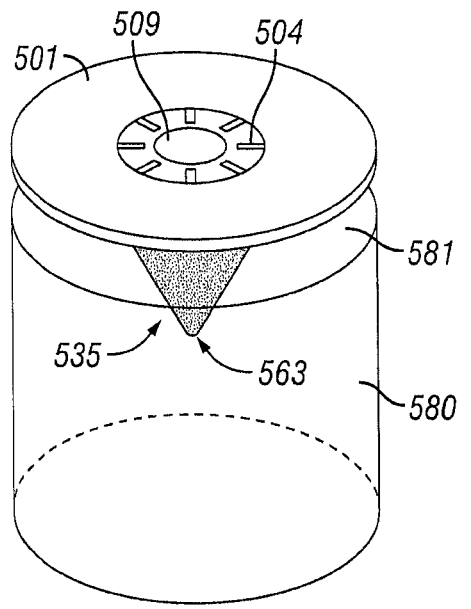
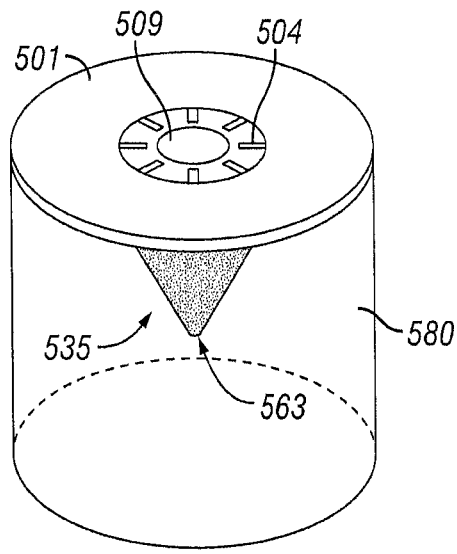
FIG. 11B  FIG. 11C
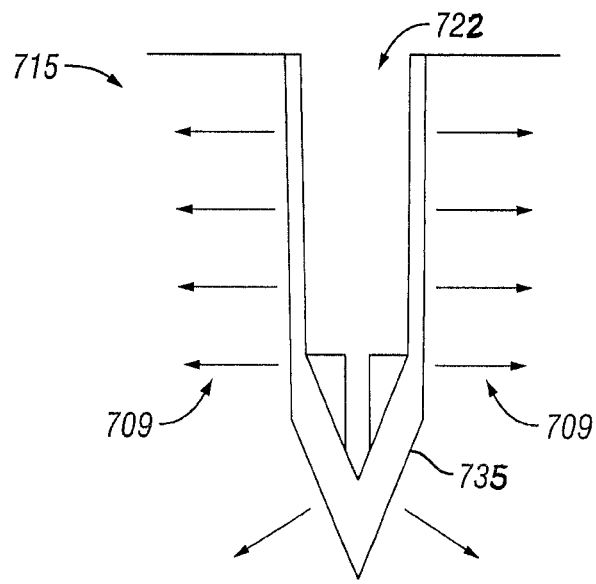
FIG. 12

APPARATUS AND PRODUCTS FOR PRODUCING BEVERAGES, AND METHODS FOR MAKING AND USING SAME

RELATED APPLICATION DATA

This application claims priority from U.S. Provisional Patent Application No. 61/399,382, filed Jul. 12, 2010, which application is hereby incorporated by reference.

BACKGROUND OF THE INVENTION

1. Field of the Invention

The present invention relates to apparatus and products for making consumable liquids, and methods of making and using such apparatus, products and liquids. In another aspect, the present invention relates to apparatus and products for brewing such consumable liquids, and methods of making and using such apparatus, products and consumable liquids. In even another aspect, the present invention relates to apparatus and products for brewing such consumable liquids by contacting a heated liquid with solid, semi-solid, syrup or gel material, and methods of making and using such apparatus, products and consumable liquids. In still another aspect, the present invention relates to apparatus and products for brewing consumable liquids such as coffee, tea, cocoa, chocolate, herbal drinks, bullion, consume, medicinal drinks, vitamin drinks, supplement drinks, dehydrated drinks, and methods of making and using such apparatus, products and beverages. In yet another aspect, the present invention relates to reusable apparatus and products for brewing consumable liquids, and methods of making and using such apparatus. In even still another aspect, the present invention relates to reusable apparatus and methods, that may be loaded/reloaded with solids, semi-solids, syrups, and gels, for brewing consumable liquids, and methods of making and using such apparatus. In even yet another aspect, the present invention relates to reusable apparatus and methods, that may be loaded/reloaded with coffee, tea, cocoa, chocolate, herbs, spices, inhalant, seeds, berries, nuts, beans, hulls, shells, husks, vegetable matter, leaves, roots, bullion, consume, medicine, vitamins, supplements, drink powder, for brewing consumable liquids, and methods of making and using such apparatus.

2. Brief Description of the Related Art

In the making of coffee, heated water is contacted with ground coffee to form a coffee beverage which may be consumed hot or cold.

As coffee is quite a historic drink, there is also a long history of development of various apparatus and methods for preparing coffee. Drip brewing is a method for brewing coffee which involves passing water over roasted, ground coffee beans contained in a filter. The water is generally gravity feed through the coffee, absorbing its oils and essences, and then on through the bottom of the filter. The used coffee grounds are retained in the filter with the liquid falling (dripping) into a collecting vessel such as a carafe or pot.

Very commonly, paper filters are commonly used for drip brew all over the world. For ease of operation, the used grounds and the filter are generally disposed of together, without a need to clean the filter, or with very little cleaning required. It is also common to see metal filter that are made of thin perforated metal sheets that restrain the grounds but allow the coffee to pass, thus eliminating the need to have to purchase separate filters. Additionally, many machines now use permanent plastic filters, which are made of a fine mesh.

There also exist small, portable, single serving drip brew makers that only hold the filter and rest on top of a cup. Hot water is poured in and drips directly into the cup.

A very popular item is the single-serving unit containing sufficient ground coffee, tea or other beverage material to produce a single cup of the contained beverage. In operation, this single-serving unit is inserted into a machine, with a cup placed under a discharge spout, and within a short period of time, the beverage is ready.

This type of single serving brewing machine operates by piercing the seal on top of the single serving container with a spray nozzle, while simultaneously piercing the bottom of the container with a discharge nozzle. The coffee grounds sit on a filter within the container, which filter is not punctured. The spray nozzle introduces water into the container, with the water passing through the grounds and through the filter into the waiting cup.

There are a number of patents that relate making coffee, specifically to beverage cartridges, the following of which are merely a small sampling.

U.S. Pat. No. D637,484, issued May 10, 2011, to Winkler, discloses an ornamental design for a beverage cartridge, as shown and described.

U.S. Pat. No. D502,362, issued on Mar. 1, 2005, to Lazaris et al, discloses an ornamental design for a disposable beverage filter cartridge, as shown and described.

U.S. Pat. No. 6,708,600, issued on Mar. 23, 2004, to Winkler et al, discloses the puncturing and venting of single serve beverage filter cartridge. A liquid inlet probe for piercing the lid of a beverage filter cartridge comprises a cylindrical inner hub surrounded by an enlarged diameter outer sleeve. Support ribs extend radially between and coact with the exterior of the hub and the interior of the sleeve to define a plurality of liquid supply passages. The hub, ribs and sleeve having bevelled lower ends arranged in a truncated conical alignment converging towards the center of the probe to a pointed end projecting downwardly from its lower end.

U.S. Pat. No. 6,658,989, issued on Dec. 9, 2003, to Sweeney et al, discloses are-usable beverage filter cartridge for use in a single serve beverage brewer in which a measured charge of a dry beverage medium is infused with a metered amount of heated liquid to produce a beverage medium. The reusable beverage filter cartridge is provided for containing the beverage medium and for accommodating an inflow of the heated liquid and an outflow of the beverage medium. The cartridge comprises a cup-shaped housing having a top opening and a closed bottom with an outlet port. A filter internally subdivides the housing into a first chamber accessible via the top opening and configured and dimensioned to contain the beverage medium, and a second chamber communicating with the outlet port. A lid is removably secured to the housing in a position closing the top opening, and an inlet port in the lid serves to admit heated liquid into the first chamber for infusion with the beverage medium contained therein. The filter is permeable to accommodate a flow therethrough of the resulting beverage into the second chamber from which it exits via the outlet port.

U.S. Pat. No. 6,645,537, issued on Nov. 11, 2003, to Sweeney et al, discloses a beverage filter cartridge that includes a cup-shaped outer container with a bottom and a side wall extending upwardly from the bottom wall to a circular rim surrounding an upper opening. The side wall has an upper section extending downwardly from the rim to an intermediate section, and a tapered lower section configured to provide a plurality of circumferentially spaced flutes extending downwardly from the intermediate section to the bottom wall. A filter element subdivides the interior of the container into first and second chambers. A beverage medium is stored in the first chamber. A cover is joined to the side wall at the rim to close the upper opening. The cover is yieldably piercable to accommodate an injection of liquid into the first chamber for combination with the beverage medium to produce a beverage. The filter element is permeable to accommodate a flow of the beverage from the first chamber into the second chamber, and the bottom wall is yieldably piercable to accommodate an outflow of the beverage from the second chamber to the exterior of the cartridge.

U.S. Pat. No. 6,607,762, issued on Aug. 19, 2003 and U.S. Pat. No. 6,589,577, issued on Jul. 8, 2003, to Lazaris et al, both disclose a disposable single serve beverage filter cartridge comprising an outer container with an access opening. A filter element is received in and configured and arranged to subdivide the interior of the container into first and second chambers. A beverage medium is stored in the first chamber. A lid closes the access opening. The lid has a first section overlying the first chamber and a second section overlying the second chamber. The first section of the lid is yieldably piercable to accommodate an inflow of liquid into the first chamber for infusion with the beverage medium to produce a beverage. The filter element is permeable to accommodate a flow of the beverage from the first chamber into the second chamber, and the second section of the lid is yieldably piercable to accommodate an outflow of the beverage from the second chamber to the exterior of the cartridge.

U.S. Pat. No. 6,606,938, issued on Aug. 19, 2003, to Taylor, discloses a two step puncturing and venting of single serve filter cartridge in a beverage brewer. In a method and apparatus for brewing a beverage from a dry beverage medium contained in a disposable cartridge, the cartridge is initially pierced and vented by a tubular outlet probe, and then pierced by a tubular inlet probe. Heated liquid is admitted to the cartridge interior via the inlet probe for combination with the beverage medium to produce a beverage, and the beverage is extracted from the cartridge via the outlet probe.

U.S. Pat. No. 5,840,189, issued on Nov. 24, 1998, to Sylvan et al, discloses a beverage filter cartridge that includes an impermeable yieldably pierceable base having a predetermined shape and an access opening at one end. A self-supporting wettable filter element is disposed in the base and is permanently sealed to an interior surface of the base. The filter element subdivides the base into first and second chambers, a first chamber for storing an extract of the beverage to be made, and a second empty chamber for accessing the beverage after the beverage outflow from the filter has been made by combining a liquid with the extract. An impermeable, yieldably pierceable, imperforate cover is sealingly engaged with the top of the base to form an impermeable cartridge.

U.S. Pat. No. 5,325,765, issued on Jul. 5, 1994, to Sylvan et al, discloses a beverage filter cartridge that includes an impermeable pierceable base having a predetermined shape and an opening at one end; a self-supporting wettable filter element disposed in the base sealingly engages with the opening in the base and has a form different and smaller than the predetermined shape of the base so that the filter element diverges from the base and divides the base into two sealed chambers, a first chamber for storing an extract of the beverage to be made, and a second empty chamber for accessing the beverage after the beverage outflow from the filter has been made by combining a liquid with the extract; and an impermeable pierceable cover sealingly engaged with the opening in the base to form an impermeable cartridge.

Other coffee related patents include:

U.S. Pat. No. 7,640,845, issued Jan. 5, 2010, Woodnorth, et al., discloses a drain for beverage forming machine.

U.S. Pat. No. 7,523,695, issued Apr. 28, 2009, to Streeter et al, discloses a system for dispensing metered volumes of heated water to the brew chamber of a single serve beverage brewer.

U.S. Pat. No. 7,513,192, issued Apr. 7, 2009, to Sullivan et al, discloses a beverage forming device with opening/closing mechanism for a beverage cartridge receiver U.S. Pat. No. 7,398,726, issued on Jul. 15, 2008, to Streeter et al, discloses a system for dispensing metered volumes of heated water to the brew chamber of a single serve beverage brewer.

U.S. Pat. No. 7,377,162, issued on May 27, 2008, to Lazaris, discloses a method and apparatus for liquid level sensing.

U.S. Pat. No. 7,360,418, issued on Apr. 22, 2008, to Pelovitz, discloses a method and apparatus for sensing liquid level using baseline characteristic.

U.S. Pat. No. 7,347,138, issued on Mar. 25, 2008, to Bragg et al, discloses a brew chamber for a single serve beverage brewer.

U.S. Pat. No. D544,299, issued on Jun. 12, 2007, to Schaffeld et al, discloses an ornamental design for coffee brewer, as shown and described.

U.S. Pat. No. 7,165,488, issued on Jan. 23, 2007, to Bragg et al, discloses a brew chamber for a single serve beverage brewer.

U.S. Pat. No. D513,572, issued on Jan. 17, 2006, to Schaffeld et al, discloses an ornamental design for a coffee brewer, as shown and described.

U.S. Pat. No. D489,215, issued on May 4, 2004, to Honan et al, discloses a coffee brewer. The ornamental design for a coffee brewer, as shown and described.

U.S. Pat. No. 6,672,200, issued on Jan. 6, 2004, to Duffy et al, discloses a system for monitoring and controlling the operation of a single serve beverage brewer.

U.S. Pat. No. 6,666,130, issued on Dec. 23, 2003, to Taylor et al, discloses a baffle operated liquid heating and dispensing system for a single serve beverage brewer.

U.S. Pat. No. 6,655,260, issued on Dec. 2, 2003, to Lazaris et al, discloses a beverage filter cartridge holder.

U.S. Pat. No. D474,111, issued on May 6, 2003, to Lazaris, discloses an ornamental design for a cup shaped container, as shown and described.

U.S. Pat. No. D474,110, issued on May 6, 2003, to Sweeney, discloses an ornamental design for a cup shaped container, as shown and described.

U.S. Pat. No. D462,865, issued on Sep. 17, 2002, to Honan et al, discloses an ornamental design for a coffee brewer, as shown and described.

U.S. Pat. No. 6,440,256, issued on Aug. 27, 2002, to Gordon et al, discloses a method of forming and inserting filter elements in cup-shaped containers.

U.S. Pat. No. D452,434, issued on Dec. 25, 2001, to Sweeney, discloses an ornamental design for a cup shaped container, as shown and described.

U.S. Pat. No. D452,433, issued on Dec. 25, 2001, to Lazaris, discloses an ornamental design for a cup shaped container, as shown and described.

U.S. Pat. No. 6,182,554, issued on Feb. 6, 2001, to Beaulieu et al, discloses a beverage filter cartridge holder.

U.S. Pat. No. 6,142,063, issued on Nov. 7, 2000, to Beaulieu, discloses a automated beverage brewing system.

U.S. Pat. No. 6,082,247, issued on Jul. 4, 2000, to Beaulieu, discloses an apparatus for consecutively dispensing an equal volume of liquid.

U.S. Pat. No. 6,079,315, issued on Jun. 27, 2000, to Beaulieu et al, discloses a beverage filter cartridge holder.

U.S. Pat. No. D408,679, issued on Apr. 27, 1999, to Potts et al, discloses an ornamental design for a coffee brewer, as shown and described.

However, in spite of the above advancements, there exists a need in the beverage brewing art for products, apparatus and methods for brewing coffee and other consumable liquids.

There also exists a need in the beverage brewing art for reusable products, apparatus and methods for brewing coffee and other consumable liquids.

There even also exists a need in the beverage brewing art for products, apparatus and methods for more efficiently brewing coffee and other consumable liquids.

These and other needs in the art will become apparent to those of skill in the art upon review of this specification, including its drawings and claims.

SUMMARY OF THE INVENTION

It is an object of the present invention to provide for products, apparatus and methods for brewing coffee and other consumable liquids.

It is another object of the present invention, to provide for reusable products, apparatus and methods for brewing coffee and other consumable liquids.

It is even another object of the present invention, to provide for products, apparatus and methods for more efficiently brewing coffee and other consumable liquids.

These and other needs in the art will become apparent to those of skill in the art upon review of this specification, including its drawings and claims.

These and other objects of the present invention will become apparent to those of skill in the art upon review of this specification, including its drawings and claims.

According to one embodiment of the present invention there is provided an extractable material container for use in a brewing machine having a water injector. The container may include a liquid impermeable housing defining a reservoir having a vertical axis and comprising a first housing portion and a second housing portion, wherein the first housing portion defines an liquid entry port into the reservoir said entry port adapted for engagement with the water injector, said entry port comprising outlets to direct any liquid entering the reservoir toward at least 3 directions away from the vertical axis, and wherein the second housing portion defines a liquid exit from the reservoir; and, may include a liquid filter positioned in the reservoir to filter any liquid prior to it exiting from the liquid exit.

According to another embodiment of the present invention, there is provided an extractable material container for use in a brewing machine having a water injector. The container may include a liquid impermeable housing defining a reservoir having a vertical axis, said reservoir defined by a first portion of the housing and a second portion of the housing, wherein the first portion of the housing defines an liquid entry port into the reservoir, said entry port directs any liquid entering the reservoir toward at least 3 directions away from the vertical axis, and wherein the second housing portion comprises a liquid permeable filter section which both defines a liquid exit from the reservoir and filters extractable material.

According to even another embodiment of the present invention, there is provided an extractable material container for use in a brewing machine having a water injector. The container, a liquid impermeable housing comprising a top, bottom and side wall connecting the top and bottom, said housing defining a reservoir having a vertical axis, wherein the housing defines an liquid entry port into the reservoir said entry port adapted for engagement with the water injector, said entry port comprising outlets to direct any liquid entering the reservoir toward at least 3 directions away from the vertical axis, and the side wall defining a liquid exit from the reservoir; and, a liquid filter positioned in the reservoir to filter any liquid prior to it exiting from the liquid exit.

According to still another embodiment of the present invention, there is provided a beverage brewing apparatus. The apparatus may include a liquid impermeable housing having a first component defining a brewing chamber having a vertical axis with an access opening, and a second component which may be opened to afford access to said brewing chamber via said access opening, and which may be closed to coact in sealing engagement with said first component to close said access opening. The apparatus may also include a cartridge removably received in said brewing chamber via said access opening, said cartridge comprising an extractable material contained therein. The apparatus may also include a liquid inlet conduit extending through said housing and into said brewing chamber and into liquid communication with the extractable material in said cartridge, wherein said liquid inlet conduit disperses any liquid into the cartridge in at least 3 directions away from the vertical axis.

According to yet another embodiment of the present invention, there is provided a brewing machine for brewing an extractable material contained within a removable cartridge having a vertical axis and loaded into the machine, which then introduces liquid into the cartridge, an improvement comprises dispersing the liquid into the cartridge in at least 3 directions away from the vertical axis.

Various sub-embodiments of all of the above embodiments, may include one or more of wherein at least a portion of the first housing portion is removable from the housing to allow access to the reservoir; wherein at least a portion of the first housing is hingeably moveable to allow access to the reservoir; wherein the liquid entry port directs liquid entering the reservoir in at least 4 directions away from the vertical axis; wherein the liquid entry port directs liquid entering the reservoir in at least 8 directions away from the vertical axis; further comprising extractable material positioned in the reservoir; and/or further comprising coffee, tea or herbal materials positioned in the reservoir.

According to even still another embodiment of the present invention, there is provided a method of brewing an extractable material contained within a removable cartridge having a vertical axis and positioned within a brewing machine, the method may include introducing liquid into the cartridge in at least 3 directions away from the vertical axis. In sub-embodiments of this method embodiment, the method may comprise introducing liquid into the cartridge in at least 4 directions, may comprise removing liquid from a side of the cartridge, may comprise removing liquid from both a side and a bottom of the cartridge, and/or may comprise introducing liquid into the cartridge in at least 4 directions.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

FIG. 1 is a schematic representation of prior art disposable single use cup 100, that includes a top seal layer 101 showing entry puncture 105 made by the water nozzle where hot water enters and exit puncture 110 where brewed coffee exits, with ground coffee is contained within filter 107.

FIG. 2 is a schematic cut away representation of a non-limiting embodiment of a single serving cup 300 of the present invention, showing a liquid distribution outlet 325, which outlet a nozzle receiving interface 205 for receiving the coffee maker nozzle as it penetrates the top seal layer 201, and with distribution outlet 325 including sufficient outlets 309 to direct water not only generally downward, but also away from the vertical axis in at least 2 directions.

FIG. 3 is a schematic representation of a non-limiting embodiment of a single serving cup 300 of the present invention, showing lid 301, distribution outlet 325, distribution outlets 309, cup walls 311 which define a steep zone, filter screen 307 defining a filter zone, seal 322, and hinge 321.

FIGS. 11A-C show a schematic of a lid 501 for and a method of modifying a commercially available single serving cup 580.

FIG. 12 shows a distribution sleeve 735 having distribution outlets 709, said distribution sleeve 735 is utilized to modify an existing distribution nozzle 722 of a brewing machine.

DETAILED DESCRIPTION OF THE INVENTION

Figure 4:
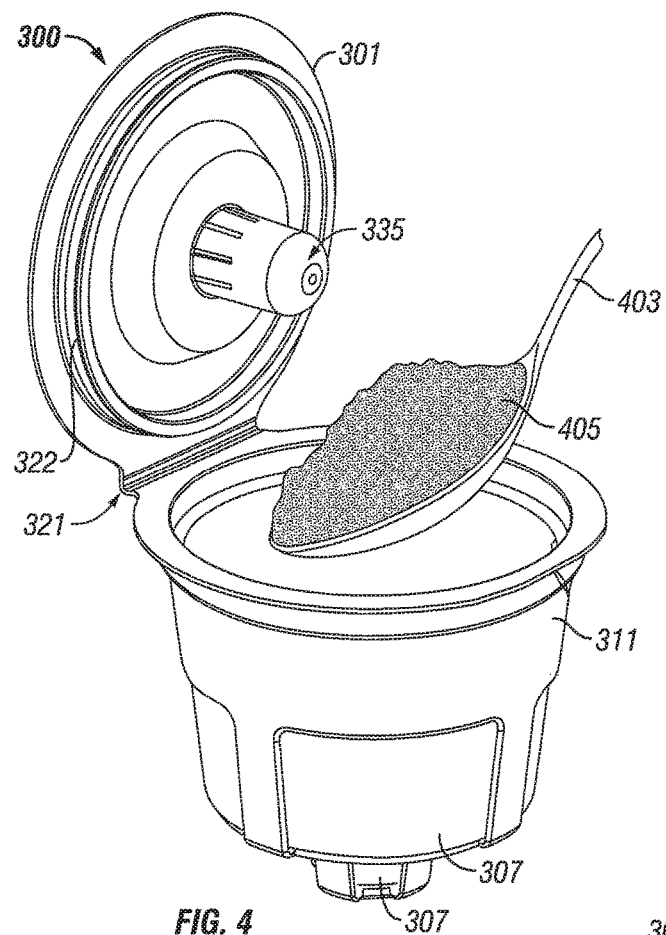
FIG. 4 is a schematic representation showing the refilling of reusable single serving cup 300, with a spoon 403 being used to refill cup 300 with coffee 405.

In one aspect, the present invention may provide a reusable single serving consumable liquid cup. The cup may be designed to provide a single serving of a consumable liquid.

In another aspect, the present invention may provide a brewing system which includes a brewing machine into which the reusable single serving consumable liquid cup is placed.

In another aspect, the present invention may provide a brewing system which includes a brewing machine which utilizes any suitable single serving consumable liquid, and that further comprises a distribution system that distributes introduced liquid in many directions.

In another aspect, the present invention may provide a method of brewing consumable liquids, and may include the step of unloading the reusable single serving cup of brewing material which is generally an extractable beverage, and/or reloading the reusable single serving cup with brewing material, and/or the step of distributing heated liquid throughout the cup, and/or draining the heated liquid from a plurality of locations from the bottom and/or side of the cup.

Non-limiting examples of brewing materials which may be utilized in consumable liquids which may be prepared by the present invention include coffee, tea, cocoa, chocolate, herbs, seeds, berries, nuts, beans, hulls, shells, husks, vegetable matter, leaves, roots, bullion, consume, medicine, vitamins, supplements, and drink powder.

Non-limiting examples of consumable liquids which may be prepared with the methods, apparatus and products of the present invention, include coffee, tea, cocoa, chocolate, herbal drinks, and drinks from berries, seeds, nuts, beans, hulls, shells, husks, vegetable matter, leaves, roots, bullion, consume, medicine, vitamins, supplements, drink powder, and the like.

Non-limiting examples of products of the present invention, include single serving cups loaded with brewing material such as coffee, tea, cocoa, chocolate, herbs, seeds, berries, nuts, beans, hulls, shells, husks, vegetable matter, leaves, roots, bullion, consume, medicine, vitamins, supplements, and drink powder.

Attention is now directed to FIG. 1 which is a schematic representation of prior art disposable single use cup 100. This cup 100 includes a top seal layer 101 showing entry puncture 105 made by the water nozzle where hot water enters and exit puncture 110 where brewed coffee exits. Exit puncture 110 is shown offset from center as occurs with most commercial machines. A brewing material, that is some sort of extractable beverage such as ground coffee, is contained within filter 107. A puncture needle penetrates cup bottom 119 sufficient to form exit puncture 110, but leaving filter 107 intact. Commercial machines tend to introduce the water through entry puncture 105 in a generally downward direction forming a typical water pattern 115 as shown. Cup 100 sidewalls form a barrier around filter 107 forcing water downward. Without being limited by theory, the inventor believes that because of the generally downward introduction of water by the brewing machine nozzle, and the water pattern 115, there tend to be dead zones within the coffee grinds, or at least zones which could steep more, resulting in weak or under-brewed coffee. These commercially available cups are also designed for a single use and are deemed disposable. Refilling these cups is generally unpractical and not done.

Referring additionally to FIG. 2, there is shown a schematic representation of a non-limiting embodiment of a single serving cup of the present invention, showing cup 200 having a liquid distribution outlet 325. This distribution outlet 325 includes a nozzle receiving interface 205 for receiving the coffee maker nozzle as it engages the top seal layer 201. In one non-limiting embodiment, distribution outlet 325 includes sufficient outlets 309 to direct water generally downward and/or away from the vertical axis in at least 2, 3, 4, 5, 6, 7, 8, 9, 10, 11, 12, 13, 14, 15, 16, 17, 18, 19, 20, 50, 75, 100, or more directions. In other non-limiting embodiments, there may be only outlets 309 to direct water away from the vertical axis. The selection of the number of outlets 309 and their direction will generally be selected based on the type of material in the cup, the particle size of the material in the cup, the desired end beverage to be obtained, the steep time, temperature of the water, and/or any other operating factors to be considered by one skilled in brewing the material. It is believed that these outlets 309 will create a favorable distribution pattern throughout the coffee grinds.

The cross-sectional shape of outlets 209 may be any suitable regular or irregular geometric shape, non-limiting examples of which include triangular, circular, oval, square, rectangular, 3, 4, 5, 6, 7, 8, 9, 10, 11, 12 or more-sided regular or irregular polygon. Outlets 209 may be of the same shape and size, or may be of different shapes and sizes.

Referring additionally to FIGS. 3-7, there is shown a non-limiting embodiment of the present invention, a reusable cup 300. As shown in FIG. 3, single serving cup 300 includes lid 301, distribution outlet 325, distribution outlets 309, cup walls 311, filter screen 307, seal 322, and hinge 321. Certainly, lid 301 does not have to be hinged to cup 300, but rather may be fully removeable.

In operation, lid 301 which is operable to be opened and closed. That is, lid 301 may be operable in an open position to allow refilling of cup 300, and then operable to reseal cup 300 for brewing.

In the non-limiting embodiment as shown in FIGS. 3-7, this lid 301 is affixed to cup 300 by a hinge 321. Certainly, it should be appreciated, that lid 301 may be operable with cup 300 to be open/closed using any suitable mechanism, including a hinge, locking engagers, interlocking teeth on lid 301 and cup 300, snap fit or friction fit between lid 301 and cup 300, engaging threads on lid 301 and cup 300, external fasteners that hold lid 301 down onto cup 300, and the like. For convenience if lid 301 is not permanently attached to cup 300 (for example by something like hinge 321), it may be tethered to cup 300. As a non-limiting example, should friction fit be utilized, lid 301 may be tethered to cup 300 to prevent its loss or misplacement.

In the non-limiting embodiment of reusable single serving cup 300 as shown, distribution outlet 335 may include sufficient outlets 309 to direct water generally downward, and/or may also include outlets 309 to direct water away from the vertical axis in at least 2, 3, 4, 5, 6, 7, 8, 9, 10, 11, 12, 13, 14, 15, 16, 17, 18, 19, 20, 50, 75, 100 or more directions. The selection of the number of outlets 309 and their direction will generally be selected based on the type of material in the cup, the particle size of the material in the cup, the desired end beverage to be obtained, the steep time, temperature of the water, and/or any other operating factors to be considered by one skilled in brewing the material. It is believed that this distribution nozzle 335 will create a favorable distribution pattern throughout the coffee grinds.

One non-limiting embodiment of the present invention may include refilling cup 300 as shown in FIG. 4, with a spoon 403 being used to refill cup 300 with coffee 405. Again, it should be understood that any suitable brewing material may be refilled into cup 300.

Figure 5:
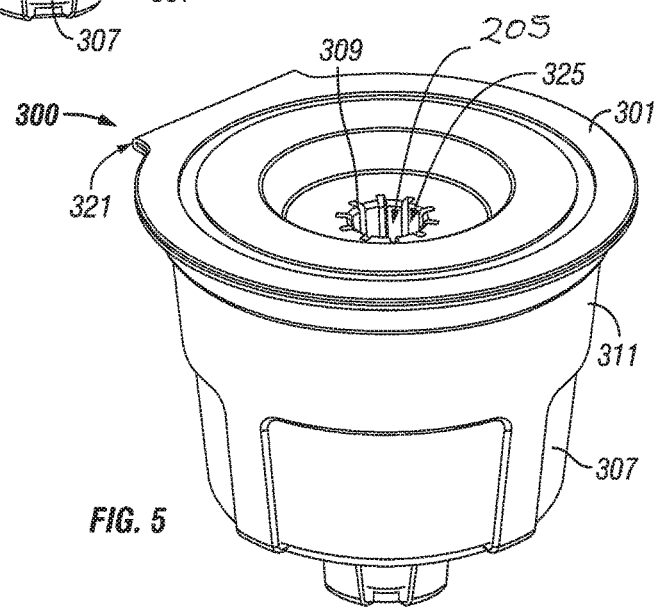
FIG. 5 is a schematic representation showing lid 301 closed reusable cup 300 ready for brewing.

FIG. 5 is a schematic representation showing lid 301 closed and reusable cup 300 ready for brewing.

Figure 6:
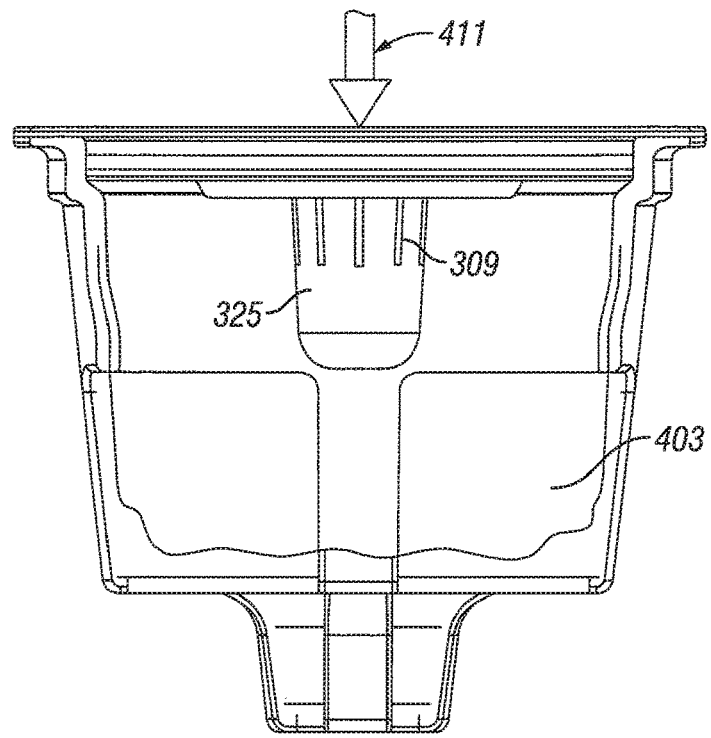
FIG. 6 is a schematic representation showing hot water 411 being introduced to reusable single serving cup 300.

FIG. 6 is a cut-away schematic representation showing hot water 411 being introduced to reusable single serving cup 300 packed with coffee 403.

Figure 7:
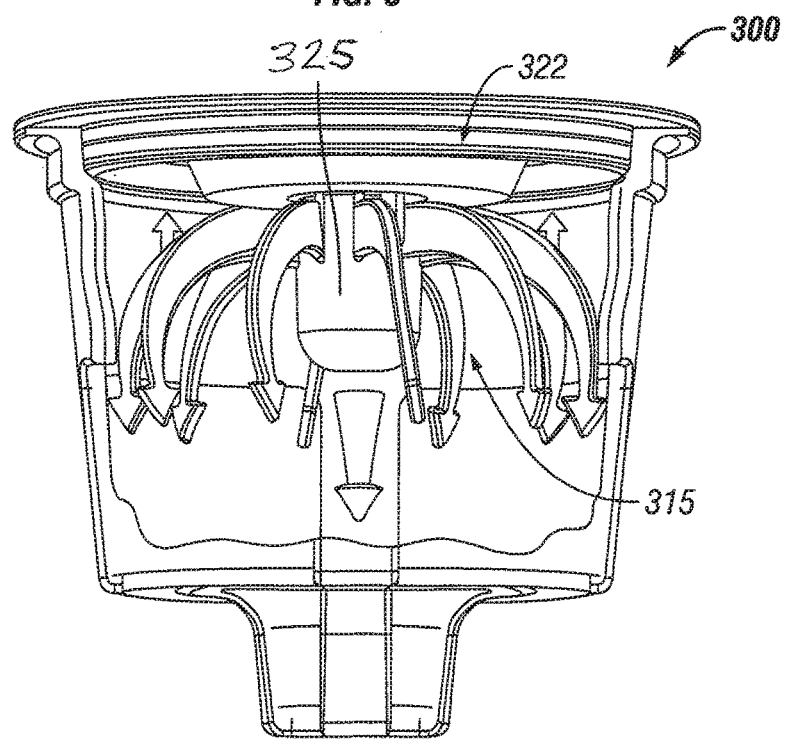
FIG. 7 is a schematic representation showing distribution pattern 315, with water being discharged from distribution outlet 325 in a plurality of directions away from the vertical axis.

FIG. 7 is a cut-away schematic representation showing distribution pattern 315, with water being discharged from distribution outlet 335 in a plurality of directions away from the vertical axis, and downward out of the bottom of distribution outlet 335.

Figures 8, 9:
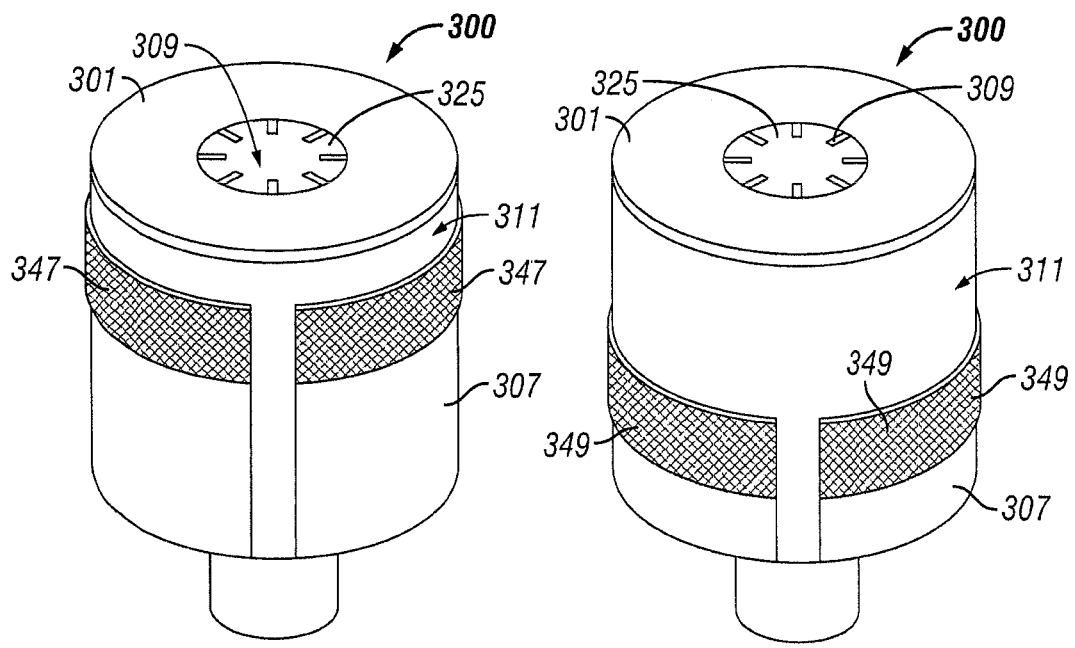
FIG. 8 and FIG. 9 both show a schematic representation of non-limiting embodiments of a single serving cup 300 of the present invention, showing lid 301, hot water distribution outlet 325, distribution outlets 309, cup walls 311 which define a smaller steep zone in FIG. 8 and a larger steep zone in FIG. 9, and filter screen 307 defining a larger filer zone in FIG. 8 and a smaller filter zone in FIG. 9.

Referring additionally to FIG. 8 and FIG. 9, there are shown other non-limiting embodiments of reusable cup 300. FIG. 8 and FIG. 9 both show a schematic representation of non-limiting embodiments of a single serving cup 300 of the present invention, showing lid 301, hot water distribution outlet 325, distribution outlets 309, cup walls 311 which define a smaller steep zone in FIG. 8 and a larger steep zone in FIG. 9, and filter screen 307 defining a larger filer zone in FIG. 8 and a smaller filter zone in FIG. 9, Specifically, the areas of side walls 311 and the areas of filter screens 307 vary between FIG. 8 and FIG. 9. As a method of the invention, and for various cup designs, it should be understood, that the ratio of these areas may be varied resulting in more/less steeping of the resultant beverage. In some embodiments, a set of single serving cups are provided having various steep zones and various filter zones. As a non-limiting example, a set of two may be provided with a first single serving cup having a smaller steep zone and a larger filter zone for making rich flavored coffee, and a second single serving cup having a larger steep zone and a smaller filter zone for making bold flavored coffee. With this set of two, a coffee drinker has the choice between making coffee that steeped longer or shorter than the other.

As another non-limiting example, a set of three single serving cups may be provided, with a first single serving cup having a small steep zone and a large filter zone for making rich flavored coffee, a second single serving cup having a medium steep zone and a medium filter zone for making full flavored coffee, and a third single serving cup having a large steep zone and a small filter zone for making bold flavored coffee. It should be understood, that small, medium and large zone sizes are relative between the three single serving cups. With this set of three, a coffee drinker has the choice of making coffee that is steeped to make rich, full (stronger), or bold (strongest).

Certainly, it should be understood that a set may consist of 2, 3, 4, 5, 6, 7, 8, 9, 10 or more cups of various steep and filter zones. In other non-limiting embodiments of the present invention, an apparatus for brewing beverages may include a single serve beverage brewing machine coupled with a set of single serve filter cups.

In even another non-limiting embodiment, a steeping strip 347 as shown in FIG. 8 may be provided that is adapted to be affixed to filter screen 307 to decrease the filter zone and increase the steep zone. Likewise, part or all of filter wall 311 may be adapted to be removable, such as portion 349 to increase the filter zone and decrease the steep zone. As a non-limiting example, portion 349 may be perforated to be easily removable. In further non-limiting embodiments, these portions 349 may be re-attachable. Methods including both removing these portions and/or adding these portions, including replacing one size with a different size portion.

Figure 11A:
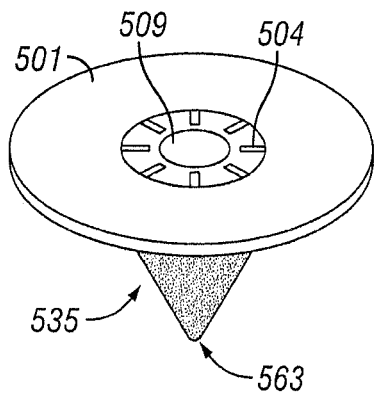

Referring additionally, to FIGS. 11A-C there is shown a schematic of a lid 501 for and a method of modifying a commercially available single serving cup 580. Single serving cup modifying lid 501 is shaped and sized to fit onto a commercially available cup 580, and includes distributor 535 having distribution outlets 509 and water inlet 504. Distributor 535 includes a puncture surface 563 adapted to penetrate and puncture membrane seal 581 of cup 580. In operation, a commercially available single serving cup is modified by contacting lid 501 puncture surface 563 with membrane 581 of serving cup 580, and then puncturing membrane 581 as shown in FIG. 11B. Continuing, lid 501 is pressed further against serving cup 580 so that distributor 535 penetrates membrane 581 to the extent that lid 501 now is resting on cup 580 as shown in FIG. 11C. In a further method of making a beverage, this modifying cup 580 is now placed in a brewing machine and the machine operated as it would be with.

The idea of modifying lid 501 is that distributor 535 will provide more distribution than the distributor of the brewing machine.

Figure 10:
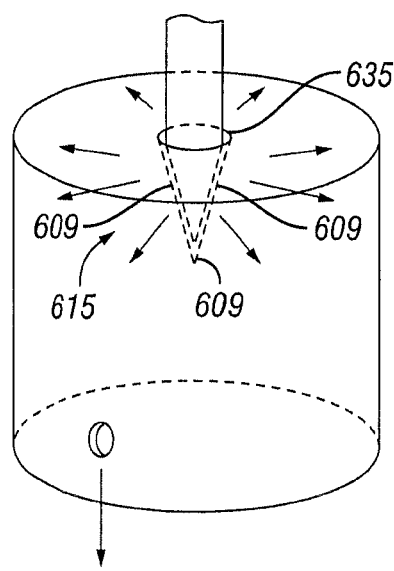
FIG. 10 is a schematic representation of a distributor 635 for a brewing machine that will provide more distribution than the standard distributors found on commercially available machines.

Referring additionally to FIG. 10, there is provided a distributor 635 for a brewing machine of the present invention, or for modifying existing brewing machines by substituting this distributor for the existing distributor. This distributor 635 will be affixed to a brewing machine, and will provide more distribution than the standard distributors found on commercially available machines. This distribution outlet 635 may include sufficient outlets 609 to direct water generally downward, and/or may also include outlets 609 to direct water away from the vertical axis in at least 2, 3, 4, 5, 6, 7, 8, 9, 10, 11, 12, 13, 14, 15, 16, 17, 18, 19, 20, or more directions. The selection of the number of outlets 609 and their direction will generally be selected based on the type of material in the cup, the particle size of the material in the cup, the desired end beverage to be obtained, the steep time, temperature of the water, and/or any other operating factors to be considered by one skilled in brewing the material. It is believed that this distribution nozzle 635 will create a favorable distribution pattern 615 throughout the coffee grinds. A further non-limiting embodiment of the present invention will also include a single serving brewing machine having distribution nozzle 635.

Referring additionally to FIG. 12, there is shown a distribution sleeve 735 having distribution outlets 709, which may be utilized in methods for modifying existing machines. This distribution sleeve 735 is utilized to modify an existing distribution nozzle 722 of a brewing machine. Distribution sleeve 735 is placed over the existing distribution nozzle 722 and provides a different distribution pattern 715 than the existing nozzle 722. Again, for the typical commercially available brewing machine, the water is distributed in a rather limited pattern. This distributor 735 may include sufficient outlets 709 to direct water generally downward, and/or may also include outlets 709 to direct water away from the vertical axis in at least 2, 3, 4, 5, 6, 7, 8, 9, 10, 11, 12, 13, 14, 15, 16, 17, 18, 19, 20, or more directions.

EXAMPLE

Equal amount of the same type of coffee were utilized in a cup 300 as shown in FIGS. 3-7, and in a commercially available "K" type cup. Each of these cups were inserted into a commercially available "K" type cup machine, using identical settings and coffee brewed. Examination of the two obtained cups of coffee by holding the clear glass cups up to light revealed that coffee brewed using cup 300 of the present invention was significantly darker, which is interpreted as a more complete brewing of the coffee.

All of the patents and applications cited in this specification, are herein incorporated by reference.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

The invention claimed is:

1. A reusable cartridge configured for being enclosed in a brewing machine, said brewing machine having a discharge needle and liquid injector, said reusable cartridge comprising:

a housing having a liquid impermeable frame defining a bottom and a side wall extending upward from the bottom, with at least one opening defined in said side wall, with a filter material spanning said opening to form a liquid exit out of the side wall, said liquid impermeable frame and said filter material defining a material holding space having an entrance thereto, said housing further defining a discharge needle space configured to receive the discharge needle without the discharge needle piercing the reusable cartridge when the reusable cartridge is enclosed in the brewing machine; and, a lid operable to seal the entrance is hingely affixed to the housing, said lid operable in an open position to allow access through the entrance to the material holding space, said lid defining a liquid entry port into the material holding space, said liquid entry port comprising a port nozzle extending into said material holding space, said liquid entry port receiving the liquid injector with at least a portion of the liquid injector extending into said port nozzle when said reusable cartridge is enclosed in the brewing machine, said port nozzle having liquid outlet orifices distributed on a periphery of a sidewall of said port nozzle with said liquid outlet orifices residing within the material holding space, said liquid outlet orifices injecting liquid from the liquid injector in a plurality of directions about the periphery of the sidewall of the port nozzle during a brewing cycle.

2. A reusable cartridge configured for being enclosed in a brewing machine, said brewing machine having a discharge needle and liquid injector, said reusable cartridge comprising:

a housing having a liquid impermeable frame defining a bottom and a side wall extending upward from the bottom, with at least one opening defined in said side wall, with a filter material spanning said opening to form a liquid exit out of the side wall, said liquid impermeable frame and said filter material defining a material holding space having an entrance thereto and having a fill line, said housing further defining a discharge needle space configured to receive the discharge needle without the discharge needle piercing the housing when the reusable cartridge is enclosed in the brewing machine; and, a lid operable to seal the entrance is hingely affixed to the housing, said lid operable in an open position to allow access through the entrance to the material holding space, said lid defining a liquid entry port into the material holding space, said liquid entry port comprising a port nozzle extending into said material holding space past the fill line, said liquid entry port receiving the liquid injector with at least a portion of the liquid injector extending into said port nozzle when said reusable cartridge is enclosed in the brewing machine, said port nozzle having liquid outlet orifices distributed on a periphery of a sidewall of said port nozzle with said liquid outlet orifices residing within the material holding space below the fill line, said liquid outlet orifices injecting liquid from the liquid injector in a plurality of directions below the fill line about the periphery of the sidewall of the port nozzle during a brewing cycle.

* * * * *